(12) United States Patent
Chiang et al.

(10) Patent No.: US 7,710,048 B2
(45) Date of Patent: May 4, 2010

(54) ILLUMINATOR BASED ON PRIMARY AND SECONDARY POWER SUPPLIES

(76) Inventors: Min-Yueh Chiang, 9F., No. 41, Jieyun Rd., Sanchong City, Taipei County 241 (TW); Pi-Pai Chang, No. 9, Lane 415, Zhengqi N. Rd., Taitung City, Taitung County 950 (TW)

( * ) Notice: Subject to any disclaimer, the term of this patent is extended or adjusted under 35 U.S.C. 154(b) by 25 days.

(21) Appl. No.: 12/127,219

(22) Filed: May 27, 2008

(65) Prior Publication Data
US 2009/0231841 A1 Sep. 17, 2009

(30) Foreign Application Priority Data
Mar. 13, 2008 (TW) .............................. 097204299

(51) Int. Cl.
*H05B 37/02* (2006.01)
(52) U.S. Cl. .................. 315/291; 315/219; 315/276
(58) Field of Classification Search .................. 315/319, 315/224, 247, 276, 291, 307, 219, 294; 362/227, 362/545, 555, 611–612
See application file for complete search history.

(56) References Cited
U.S. PATENT DOCUMENTS
3,295,050 A * 12/1966 Kennedy et al. ............ 363/171

| | | | |
|---|---|---|---|
| 5,924,784 A * | 7/1999 | Chliwnyj et al. | ............ 362/234 |
| 2008/0116818 A1* | 5/2008 | Shteynberg et al. | ......... 315/192 |
| 2009/0189539 A1* | 7/2009 | Deng et al. | .................. 315/294 |
| 2009/0195189 A1* | 8/2009 | Zampini et al. | ............. 315/295 |
| 2009/0224686 A1* | 9/2009 | Kunimatsu | .................. 315/291 |

* cited by examiner

*Primary Examiner*—David Hung Vu
*Assistant Examiner*—Tung X Le
(74) *Attorney, Agent, or Firm*—Jackson IPG PLLC

(57) ABSTRACT

An illuminator includes a primary power supply and a secondary supply. The first power supply includes a primary wire. The secondary power supply includes two energy-recycling units each comprising a magnetically conductive annular core made of iron powder and a secondary wire wound around the magnetically conductive annular core. The primary wire is wound around the energy-recycling units. A first illumination unit is connected to the primary wire. A second illumination unit is connected to the secondary wires. A first pulse modulator is connected to the primary wire and the first illumination unit. A second pulse modulator is connected to the primary wire and the second illumination unit. An oscillator is connected to the primary wire and the first pulse modulator.

7 Claims, 3 Drawing Sheets

ILLUMINATOR BASED ON PRIMARY AND SECONDARY POWER SUPPLIES

FIELD OF INVENTION

The present invention relates to a low-consumption and high-efficiency illuminator and, more particularly, to an illuminator based on primary and secondary power supplies.

BACKGROUND OF INVENTION

Global warning causes catastrophes and changes in ecosystems. Hence, much attention is paid to so-called green industries focused on low consumption and high efficiency. A lot of effort is made to develop light-emitting diodes because they are small in size, long in life and quick in response, produce a little heat, consume a little energy and do not include mercury. Most of the effort is made to improve the efficiency of the light-emitting diodes.

Conventionally, light-emitting diodes are connected to one another in parallel or serial, thus forming an array. The array is connected to a power supply so that each light-emitting diode therein emits light. If the illumination is not enough, more light-emitting diodes care connected to one another in parallel or serial, thus forming another array. The additional array is connected to an additional power supply.

As discussed above, each array is connected to a power supply, i.e., two power supplies are used for two arrays. To double the illumination, the consumption of energy must be doubled.

The present invention is therefore intended to obviate or at least alleviate the problems encountered in prior art.

SUMMARY OF INVENTION

It is the primary objective of the present invention to provide an economic and efficient illuminator.

To achieve the foregoing objective, the illuminator includes a primary power supply and a secondary supply. The first power supply includes a primary wire. The secondary power supply includes two energy-recycling units each comprising a magnetically conductive annular core made of iron powder and a secondary wire wound around the magnetically conductive annular core. The primary wire is wound around the energy-recycling units A first illumination unit is connected to the primary wire. A second illumination unit is connected to the secondary wires. A first pulse modulator is connected to the primary wire and the first illumination unit. A second pulse modulator is connected to the primary wire and the second illumination unit. An oscillator is connected to the primary wire and the first pulse modulator.

Other objectives, advantages and features of the present invention will become apparent from the following description referring to the attached drawings.

BRIEF DESCRIPTION OF DRAWINGS

The present invention will be described via the detailed illustration of the preferred embodiment referring to the drawings.

DETAILED DESCRIPTION OF PREFERRED EMBODIMENT

Figure 1:
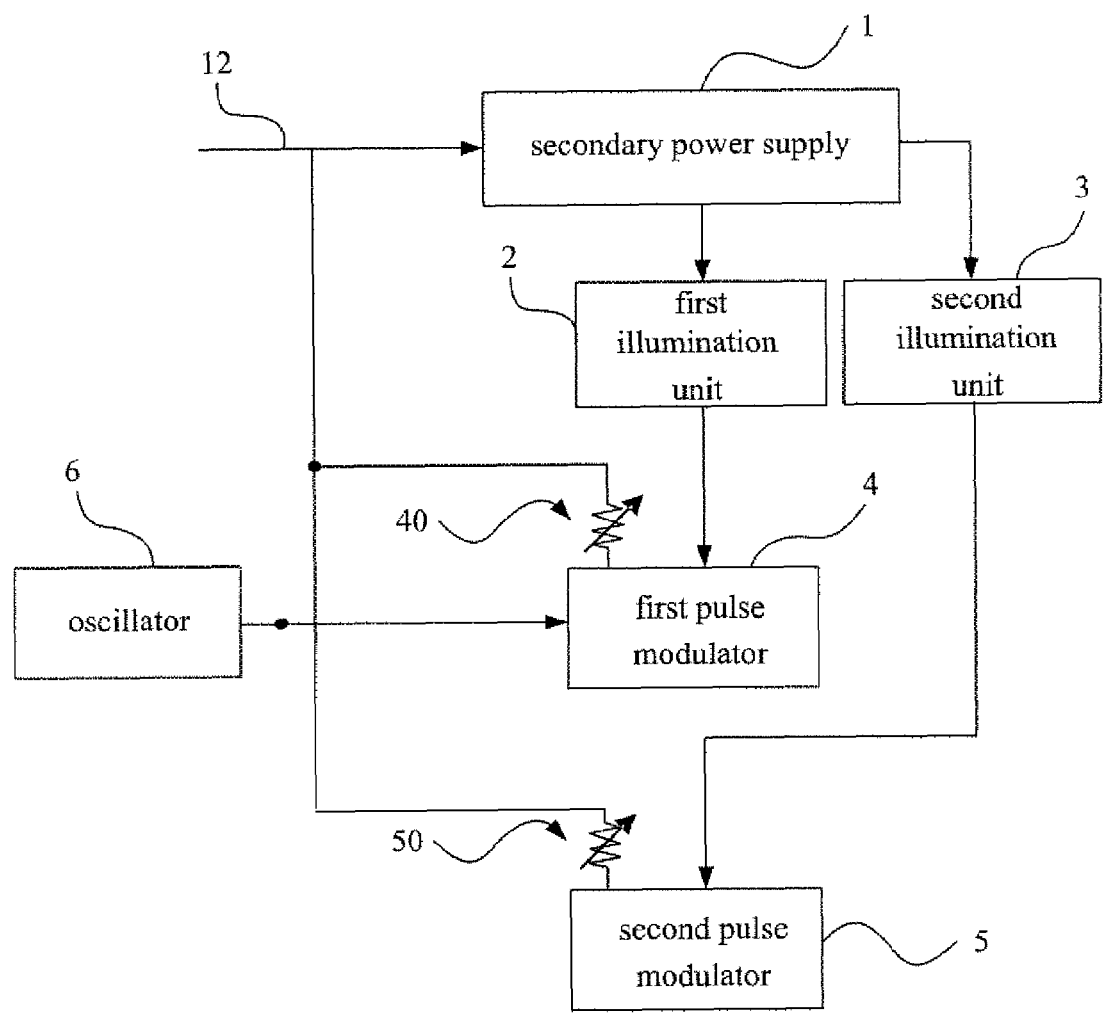
FIG. 1 is a block diagram of an illuminator based on primary and secondary power supplies according to the preferred embodiment of the present invention.
Figure 2:
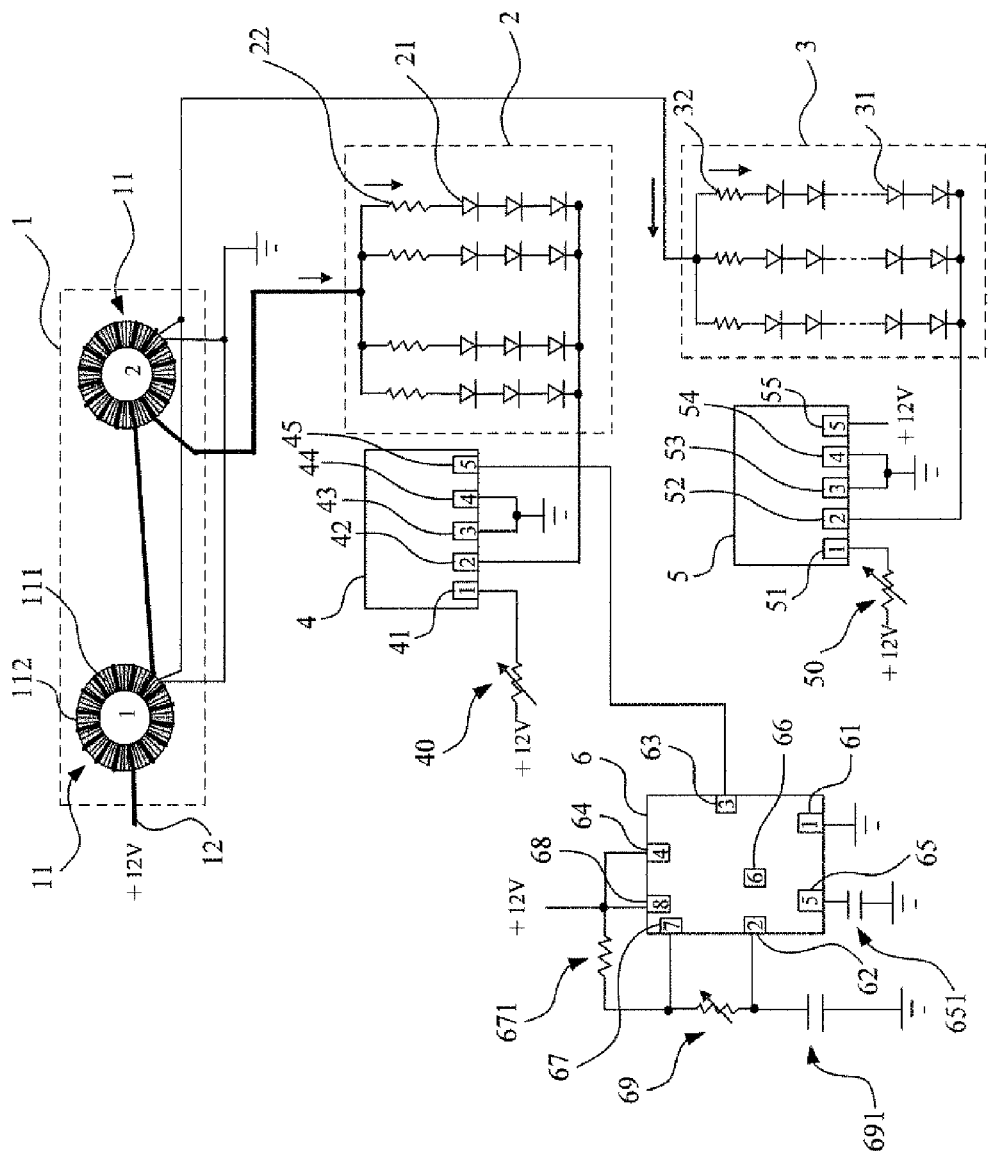
FIG. 2 is a circuit diagram of the illuminator shown in FIG. 1.

Referring to FIGS. 1 and 2, there is shown an illuminator according to the preferred embodiment of the present invention. The illuminator includes a primary power supply a secondary power supply 1, a first illumination unit 2, a second illumination unit 3, a first pulse modulator 4, a second pulse modulator 5 and an oscillator 6.

The secondary power supply 1 includes two energy-recycling units 11. Each of the energy-recycling units 11 includes a magnetically conductive annular core 112 made of iron powder and a secondary wire 111 wound around the magnetically conductive annular core 112.

The primary power supply includes a primary wire 12. The primary wire 12 is wound around both of the energy-recycling units 11.

The first illumination unit 2 is connected to the primary wire 12. The first illumination unit 2 includes an array consisting of light-emitting diodes 21 connected to resistors 22.

The second illumination unit 3 is connected to the secondary wires 111. The second illumination unit 3 includes an array consisting of light-emitting diodes 31 connected to resistors 32.

The first pulse modulator 4 is connected to the primary wire 12 and the first illumination unit 2. The first pulse modulator 4 is preferably a DD311 IC. The first pin 41 of the first pulse modulator 4 is connected to the primary wire 12 through a first reference resistor 40. The second pin 42 of the first pulse modulator 4 is connected to the first illumination unit 2. The third pin 43 and the fourth pin 44 of the first pulse modulator 4 are grounded. The fifth pin 45 of the first pulse modulator 4 is connected to the second pin 42 and the oscillator 6. The constant current source of the first pulse modulator 4 is 1:100.

The second pulse modulator 5 is connected to the primary wire 12 and the second illumination unit 3. The second pulse modulator 5 is also preferably a DD311 IC. The first pin 51 of the second pulse modulator 5 is connected to the primary wire 12 through a second reference resistor 50. The second pin 52 of the second pulse modulator 5 is connected to the second illumination unit 3. The third pin 53 and the fourth pin 54 of the second pulse modulator 5 are grounded. The fifth pin 55 of the second pulse modulator 5 is connected to the second pin 52 and the primary wire 12. The constant current source of the second pulse modulator 5 is 1:100.

The oscillator 6 is connected to the primary wire 12 and the first pulse modulator 4. The oscillator 6 is preferably a D555 IC. The first pin 61 of the oscillator 6 is grounded. The second pin 62, the fourth pin 64, the sixth pin 66, the seventh pin 67 and the eighth pin 68 of the oscillator 6 are connected to the primary wire 12. The third pin 63 of the oscillator 6 is connected to the fifth pin 45 of the first pulse modulator 4. The fifth pin 65 of the oscillator 6 is grounded through a capacitor 651, A variable resistor 69 is provided between the second pin 62 and the seventh pin 67 of the oscillator 6. The variable resistor 69 is grounded through a capacitor 691. A resistor 671 is provided between the seventh pin 67 and the eighth pin 68 of the oscillator 6.

Figure 3:
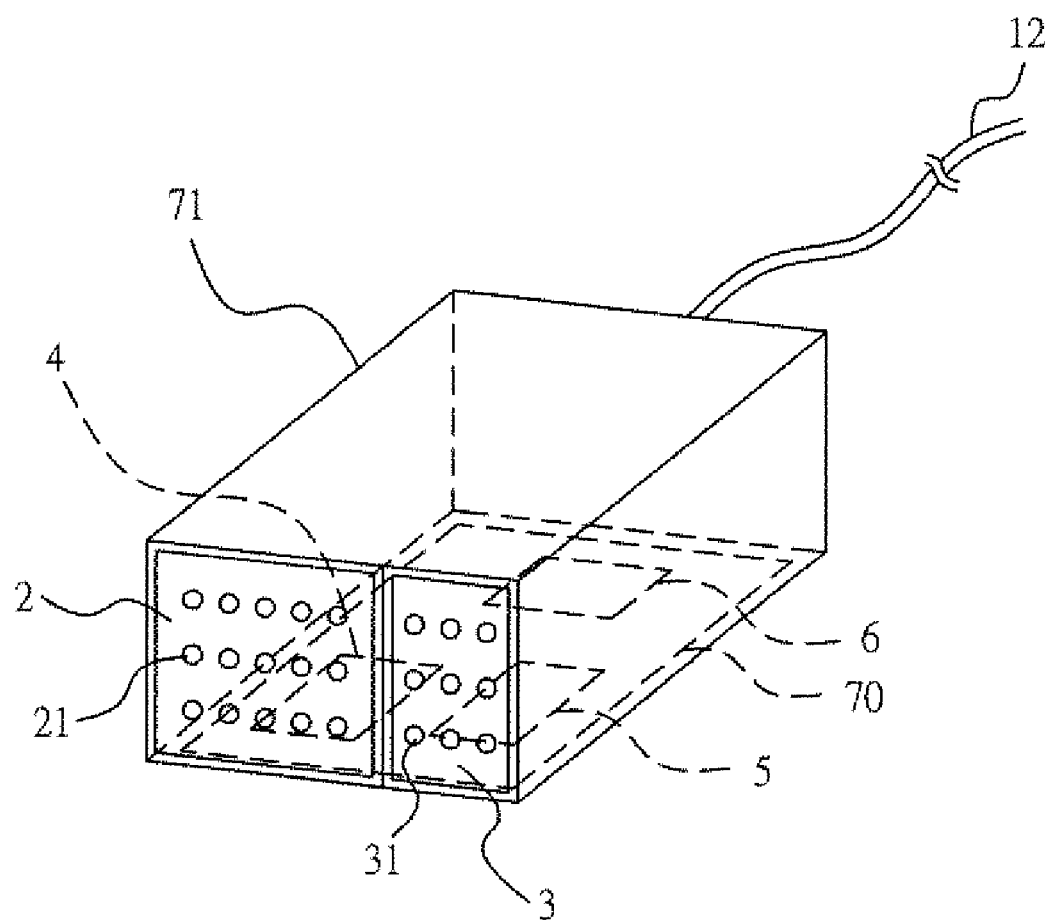
FIG. 3 is a perspective view of a box equipped with the illuminator shown in FIG. 1.

Referring to FIG. 3, the first illumination unit 2, the second illumination unit 3, the first modulator 4, the second pulse modulator 5 and the oscillator 6 are provided on a circuit board 70. The circuit board 70 is provided on a box 71. The first illumination unit 2 and the second illumination unit 3 are provided on a same side of the box 71. The first illumination unit 2 is however separated from the second illumination unit 3.

In use, the primary power supply provides primary electricity to the light-emitting diodes 21 of the first illumination unit 2 through the primary wire 12. The oscillator 6 cooperates with the first reference resistor 40 to regulate a first reference current, thus regulating a primary current going through the primary wire 12. Accordingly, the intensity of light emitted from the first illumination unit 2 is regulated.

On the other hand, the primary current, which goes through the primary wire 12, causes a magnetic field in each of the energy-recycling units 11. Each of the magnetically conductive annular cores 112 renders the magnetic field strong and even. The magnetic filed induces a secondary current in each of the secondary wires 111. The secondary currents energize the light-emitting diodes 31 of the second illumination unit 3. Similarly, the second reference resistor 50 regulates a second reference current, thus regulating the secondary currents going through the secondary wires 11. Accordingly, the intensity of light emitted from the second illumination unit 3 is regulated.

As discussed above both of the first illumination unit 2 and the second illumination unit 3 emit light. However, there is only the single primary power supply for energizing the first illumination unit 2. The second illumination unit 3 only consumes the secondary energy obtained from the recycling of a portion of the primary energy that would otherwise be wasted. Therefore, the illuminator provides a high intensity of light without consuming a lot of energy from the primary power supply.

The present invention has been described via the detailed illustration of the preferred embodiment Those skilled in the art can derive variations from the preferred embodiment without departing from the scope of the present invention. Therefore, the preferred embodiment shall not limit the scope of the present invention defined in the claims.

The invention claimed is:

1. An illuminator comprising:
   a primary power supply comprising a primary wire;
   a secondary power supply comprising two energy-recycling units each comprising a magnetically conductive annular core made of iron powder and a secondary wire wound around the magnetically conductive annular core, wherein the primary wire is wound around the energy-recycling units;
   a first illumination unit connected to the primary wire;
   a second illumination unit connected to the secondary wires;
   a first pulse modulator connected to the primary wire and the first illumination unit;
   a second pulse modulator connected to the primary wire and the second illumination unit; and
   an oscillator connected to the primary wire and the first pulse modulator,
   wherein the first pulse modulator is a DD311 IC comprising:
   a first pin connected to the primary wire through a first reference resistor;
   a second pin connected to the first illumination unit;
   a third pin grounded;
   a fourth pin grounded; and
   a fifth pin connected to the second pin and the oscillator.

2. The illuminator according to claim 1, wherein the first illumination unit comprises a plurality of light-emitting diodes and a plurality of resistors connected to the light-emitting diodes.

3. The illuminator according to claim 1, wherein the second illumination unit comprises a plurality of light-emitting diodes and a plurality of resistors connected to the light-emitting diodes.

4. The illuminator according to claim 1, wherein the constant current source of the first pulse modulator is 1:100.

5. An illuminator comprising:
   a primary power supply comprising a primary wire;
   a secondary power supply comprising two energy-recycling units each comprising a magnetically conductive annular core made of iron powder and a secondary wire wound around the magnetically conductive annular core, wherein the primary wire is wound around the energy-recycling units;
   a first illumination unit connected to the primary wire;
   a second illumination unit connected to the secondary wires;
   a first pulse modulator connected to the primary wire and the first illumination unit;
   a second pulse modulator connected to the primary wire and the second illumination unit; and
   an oscillator connected to the primary wire and the first pulse modulator, wherein the second pulse modulator is a DD311 IC comprising:
   a first pin connected to the primary wire through a second reference resistor;
   a second pin connected to the second illumination unit;
   a third pin grounded;
   a fourth pin grounded; and
   a fifth pin connected to the second pin and the primary wire.

6. The illuminator according to claim 5, wherein the constant current source of the second pulse modulator is 1:100.

7. An illuminator comprising:
   a primary power supply comprising a primary wire;
   a secondary power supply comprising two energy-recycling units each comprising a magnetically conductive annular core made of iron powder and a secondary wire wound around the magnetically conductive annular core, wherein the primary wire is wound around the energy-recycling units;
   a first illumination unit connected to the primary wire;
   a second illumination unit connected to the secondary wires;
   a first pulse modulator connected to the primary wire and the first illumination unit;
   a second pulse modulator connected to the primary wire and the second illumination unit; and
   an oscillator connected to the primary wire and the first pulse modulator,
   wherein the oscillator is a D555 IC comprising:
   a first pin grounded;
   a second pin connected to the primary wire;
   a third pin connected to the fifth pin of the first pulse modulator;
   a fourth pin connected to the primary wire;
   a fifth pin grounded through a capacitor;
   a sixth pin connected to the primary wire;
   a seventh pin connected to the primary wire;
   an eighth pin connected to the primary wire;
   a variable resistor provided between the second and seventh pins of the oscillator and grounded through a capacitor; and
   a resistor provided between the seventh and eighth pins.

* * * * *